US010003286B2

(12) United States Patent
Kawamura et al.

(10) Patent No.: US 10,003,286 B2
(45) Date of Patent: Jun. 19, 2018

(54) MOTOR CONTROL DEVICE AND STEERING CONTROL DEVICE

(71) Applicant: JTEKT CORPORATION, Osaka-shi, Osaka (JP)

(72) Inventors: Hiroshi Kawamura, Okazaki (JP); Toshihiro Takahashi, Nishio (JP); Tomohiro Niwa, Okazaki (JP); Kenichi Toyozumi, Toyota (JP); Takahito Hashimoto, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days. days.

(21) Appl. No.: 15/454,422

(22) Filed: Mar. 9, 2017

(65) Prior Publication Data

US 2017/0272009 A1 Sep. 21, 2017

(30) Foreign Application Priority Data

Mar. 17, 2016 (JP) .................................. 2016-054175

(51) Int. Cl.
*H02H 7/08* (2006.01)
*H02P 6/12* (2006.01)
(Continued)

(52) U.S. Cl.
CPC .............. *H02P 6/12* (2013.01); *B60L 3/0046* (2013.01); *B60L 3/0069* (2013.01); *B62D 5/046* (2013.01);
(Continued)

(58) Field of Classification Search
CPC ........ H02P 6/12; B62D 5/0484; B62D 5/0487
(Continued)

(56) References Cited

U.S. PATENT DOCUMENTS

2005/0135035 A1* 6/2005 Tsutsui ................... B62D 5/008
361/93.1
2009/0021207 A1* 1/2009 Kezobo ................ B62D 5/0484
318/798
(Continued)

FOREIGN PATENT DOCUMENTS

EP 1 336 528 A2 8/2003
EP 2 610 601 A1 7/2013
(Continued)

OTHER PUBLICATIONS

Aug. 18, 2017 Search Report issued in European Patent Application No. 17161364.9.

*Primary Examiner* — Erick Glass
(74) *Attorney, Agent, or Firm* — Oliff PLC (57) ABSTRACT

A steering control device capable of suppressing a reduction in reliability even in the case where the redundancy of the power source is increased is provided. A steering ECU includes two control systems in which different external power sources are connected to two drive circuits. The low potential sides of the drive circuits and the low potential sides of the corresponding external power sources are independently connected to each other via power source ground lines for the two control systems. The low potential sides of the drive circuits are connected to each other via an internal ground. Two current detection circuits are provided between the power source ground lines and the internal ground to detect power source ground current values, respectively. The steering ECU includes microcomputers that detect a ground abnormality on the basis of the results of detection performed by the current detection circuits.

6 Claims, 7 Drawing Sheets

(51) Int. Cl.

| | | |
|---|---|---|
| *B62D 5/04* | (2006.01) | |
| *H02P 6/16* | (2016.01) | |
| *H02P 25/22* | (2006.01) | |
| *B60L 3/00* | (2006.01) | |
| *B62D 15/02* | (2006.01) | |
| *H02P 27/08* | (2006.01) | |
| *H02P 31/00* | (2006.01) | |
| *H02P 6/28* | (2016.01) | |

(52) U.S. Cl.
CPC ......... *B62D 5/0484* (2013.01); *B62D 5/0487* (2013.01); *B62D 15/025* (2013.01); *H02P 6/16* (2013.01); *H02P 6/28* (2016.02); *H02P 25/22* (2013.01); *H02P 27/08* (2013.01); *H02P 31/00* (2013.01)

(58) Field of Classification Search
USPC ............................................. 318/400.21, 139
See application file for complete search history.

(56) References Cited

U.S. PATENT DOCUMENTS

| | | | |
|---|---|---|---|
| 2011/0175619 A1 | 7/2011 | Bauer et al. | |
| 2011/0290580 A1* | 12/2011 | Mukai ..................... | B62D 5/04 180/443 |
| 2014/0229062 A1 | 8/2014 | Kimura et al. | |
| 2016/0036371 A1* | 2/2016 | Yamasaki ............ | B62D 5/0403 318/400.22 |
| 2016/0224227 A1* | 8/2016 | Brush ................. | G06F 3/04847 |

FOREIGN PATENT DOCUMENTS

| | | |
|---|---|---|
| EP | 2 805 873 A2 | 11/2014 |
| JP | 2015-080327 A | 4/2015 |

\* cited by examiner

MOTOR CONTROL DEVICE AND STEERING CONTROL DEVICE

INCORPORATION BY REFERENCE

The disclosure of Japanese Patent Application No. 2016-054175 filed on Mar. 17, 2016 including the specification, drawings and abstract, is incorporated herein by reference in its entirety.

BACKGROUND OF THE INVENTION

1. Field of the Invention

The present invention relates to a motor control device and a steering control device.

2. Description of the Related Art

Japanese Patent Application Publication No. 2015-80327 (JP 2015-80327 A), for example, discloses a motor control device that includes two control systems (control units or inverters) that supply drive electric power to a motor using external power sources as electric power sources. The motor control device also includes two electric power supply paths that connect between the two control systems and the external power sources, respectively. This increases the redundancy of the control system in the motor control device described in JP 2015-80327 A.

To increase the redundancy in a motor control device, it is also conceivable to increase the redundancy of the electric power source of drive electric power by connecting different external power sources to control systems. That is, different external power sources are independently connected to the motor control device, and the low potential sides of the different external power sources are connected to the control systems of the motor control device via power source grounds (so-called "frame grounds") which are independent grounds, for example. In order to enable communication between the control systems, the low potential sides of the control systems are connected to each other via an internal ground (so-called "signal ground") which is a common ground.

In the case where an abnormality such as a short circuit is caused in any of the power source grounds in the example described above, the control systems are connected to the remaining normal power source grounds through the internal ground. That is, the control system connected to the power source ground in which an abnormality is caused can operate normally through the remaining normal power source grounds. Therefore, in the case where the redundancy of the electric power source of drive electric power is increased, it is difficult to detect an abnormality in the power source grounds even if operation of the motor control device is monitored from the outside, which may lower the reliability of the motor control device.

Besides, the motor control device may be used as a steering control device for a vehicle when the motor control device is mounted on the vehicle which enables automated drive in which the travel direction of the vehicle is automatically varied. To increase the redundancy of the electric power source of drive electric power as in the example described above in such a steering control device, an abnormality in the power source ground may not be detected immediately, e.g. the timing to stop the automated drive function may be delayed, which may lower the reliability of the steering control device.

SUMMARY OF THE INVENTION

It is one of objects of the present invention to provide a motor control device and a steering control device capable of suppressing a reduction in reliability even in the case where the redundancy of the electric power source of drive electric power is increased.

An aspect of the present invention provides a motor control device including:

a plurality of drive circuits that operate to supply drive electric power to windings of a motor to be controlled using external power sources as electric power sources.

A plurality of control systems are constituted by connecting different external power sources to the plurality of drive circuits. The plurality of control systems are configured such that low potential sides of the drive circuits and low potential sides of the corresponding external power sources are connected to each other via a plurality of power source grounds which are independent grounds for the control systems, and the low potential sides of the drive circuits are connected to each other via an internal ground which is a common ground, and a plurality of current detection circuits are provided between the plurality of power source grounds and the internal ground to detect respective ground currents which are currents of the plurality of power source grounds. The motor control device includes an abnormality detection circuit that detects a ground abnormality which is an abnormality in each of the power source grounds in the plurality of control systems on the basis of results of detection performed by the plurality of current detection circuits.

In the configuration described above, when a ground abnormality is caused, the control systems can be connected to the remaining normal power source ground, that is, the control system which has been connected to the power source ground in which an abnormality is caused is allowed to operate normally through the remaining normal power source ground. Consequently, a characteristic state is observed also in ground currents which are the power source ground currents when a ground abnormality is caused.

In the state described above, with the configuration described above, a characteristic state of the ground currents can be detected on the basis of the results of detection performed by the plurality of current detection circuits in the case where an abnormality such as a short circuit is caused in any of the plurality of power source grounds. In addition, the plurality of current detection circuits are provided between the plurality of power source grounds and the internal ground. Thus, a characteristic state of the ground currents can be detected for each of the plurality of power source grounds. Consequently, an abnormality of the power source grounds can be detected suitably by monitoring the current detection circuits of the motor control device, and a ground abnormality can be addressed immediately by stopping operation of the control system which has been connected to the power source ground in which the abnormality is caused or the like. Thus, it is possible to suppress a reduction in reliability of the motor control device even in the case where the redundancy of the electric power source of drive electric power is increased.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
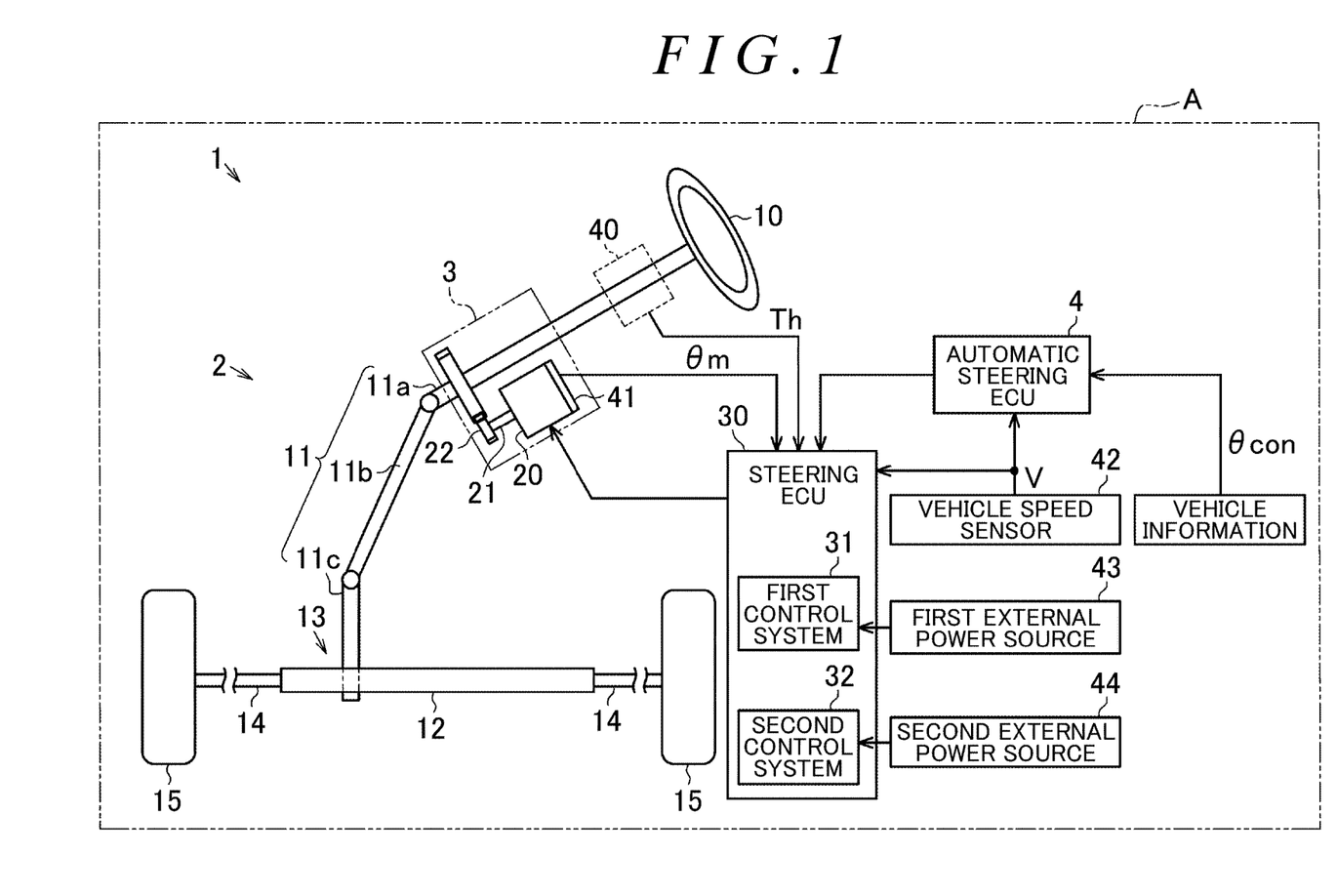
FIG. 1 illustrates an overview of an automatic steering device.

A motor control device and a steering control device according to a first embodiment will be described below. As illustrated in FIG. 1, a vehicle A is provided with an automatic steering device 1 configured to provide a steering mechanism 2 to be discussed later with power for automatically varying the travel direction of the vehicle.

The steering mechanism 2 includes a steering wheel 10 operated by a user, and a steering shaft 11 fixed to the steering wheel 10. The steering shaft 11 has a column shaft 11a coupled to the steering wheel 10, an intermediate shaft 11b coupled to the lower end portion of the column shaft 11a, and a pinion shaft 11c coupled to the lower end portion of the intermediate shaft 11b. The lower end portion of the pinion shaft 11c is coupled to a rack shaft 12 via a rack-and-pinion mechanism 13. Rotational motion of the steering shaft 11 is converted into reciprocal linear motion of the rack shaft 12 in the axial direction via the rack-and-pinion mechanism 13. The reciprocal linear motion is transferred to right and left steered wheels 15 via tie rods 14 coupled to respective ends of the rack shaft 12 to vary a steered angle of the steered wheels 15.

A steering force application mechanism 3 is provided in the middle of the column shaft 11a which is fixed to the steering wheel 10. The steering force application mechanism 3 has a motor 20 that serves as a generation source of a steering force to be applied to the steering mechanism 2 as power. For example, the motor 20 is a surface permanent magnet synchronous motor (SPMSM), and is a three-phase brushless motor that is rotated on the basis of drive electric power with three phases (U-, V-, and W-phases). A rotary shaft 21 of the motor 20 is coupled to the column shaft 11a via a speed reduction mechanism 22. The steering force application mechanism 3 transfers a rotational force of the rotary shaft 21 of the motor 20 to the column shaft 11a via the speed reduction mechanism 22. Torque (rotational force) of the motor 20 applied to the column shaft 11a serves as a steering force to vary the steered angle of the right and left steered wheels 15.

A steering electronic control unit (ECU) 30 is connected to the motor 20. The steering ECU 30 controls drive of the motor 20 by controlling the amount of current which is a control amount for the motor 20. The steering ECU 30 controls drive of the motor 20 on the basis of the results of detection (electric signal) performed by various sensors provided in the vehicle A. Examples of the various sensors include a torque sensor 40, a rotational angle sensor 41, and a vehicle speed sensor 42. The torque sensor 40 is provided to the column shaft 11a. The rotational angle sensor 41 is provided to the motor 20. The torque sensor 40 detects steering torque Th caused in the steering shaft 11 by a steering operation by the user. The rotational angle sensor 41 detects a rotational angle θm of the rotary shaft 21 of the motor 20. The vehicle speed sensor 42 detects a vehicle speed V which is the travel speed of the vehicle A. In the embodiment, the steering ECU 30 is an example of the motor control device and the steering control device.

A first external power source 43 and a second external power source 44 such as batteries mounted on the vehicle A are connected to the steering ECU 30. The external power sources 43 and 44 start the power supply to the steering ECU 30 when an ignition signal IG is input. An automatic steering ECU 4 mounted on the vehicle is also connected to the steering ECU 30. The automatic steering ECU 4 commands the steering ECU 30 to control automatic steering in which the travel direction of the vehicle is automatically varied in accordance with the travel state of the vehicle as advanced drive assist such as automated drive.

The automatic steering ECU 4 receives, as an input, vehicle information θcon that indicates the travel state of the vehicle. The vehicle information θcon is various types of information that indicate the travel state of the vehicle, including the surrounding environment of the vehicle, recognized by a Global Positioning System (GPS) such as a car navigation system, the vehicle speed sensor 42, and other sensors mounted on the vehicle (such as a camera, a distance sensor, a yaw rate sensor, and laser) or through vehicle-to-road communication. The automatic steering ECU 4 outputs to the steering ECU 30 an external command value θs* (electric signal) generated on the basis of the vehicle information θcon and used to control automatic steering.

A changeover switch (not illustrated) is connected to the steering ECU 30. The changeover switch is operated by the user, and provides a command for switching whether or not to set an automatic steering mode in which the steering ECU 30 executes automatic steering control. While a command to set the automatic steering mode is provided, the steering ECU 30 executes automatic steering control related to automatic steering, and, if the user makes an interventional steering operation, executes interventional steering control in which the steering operation is assisted along with automatic steering control. While a command to set the automatic steering mode is not provided (while a command not to set the automatic steering mode is provided), the steering ECU 30 executes EPS control in which a steering operation is assisted without executing automatic steering control. In this case, the steering ECU 30 invalidates the external command value θs* output from the automatic steering ECU 4.

Figure 2:
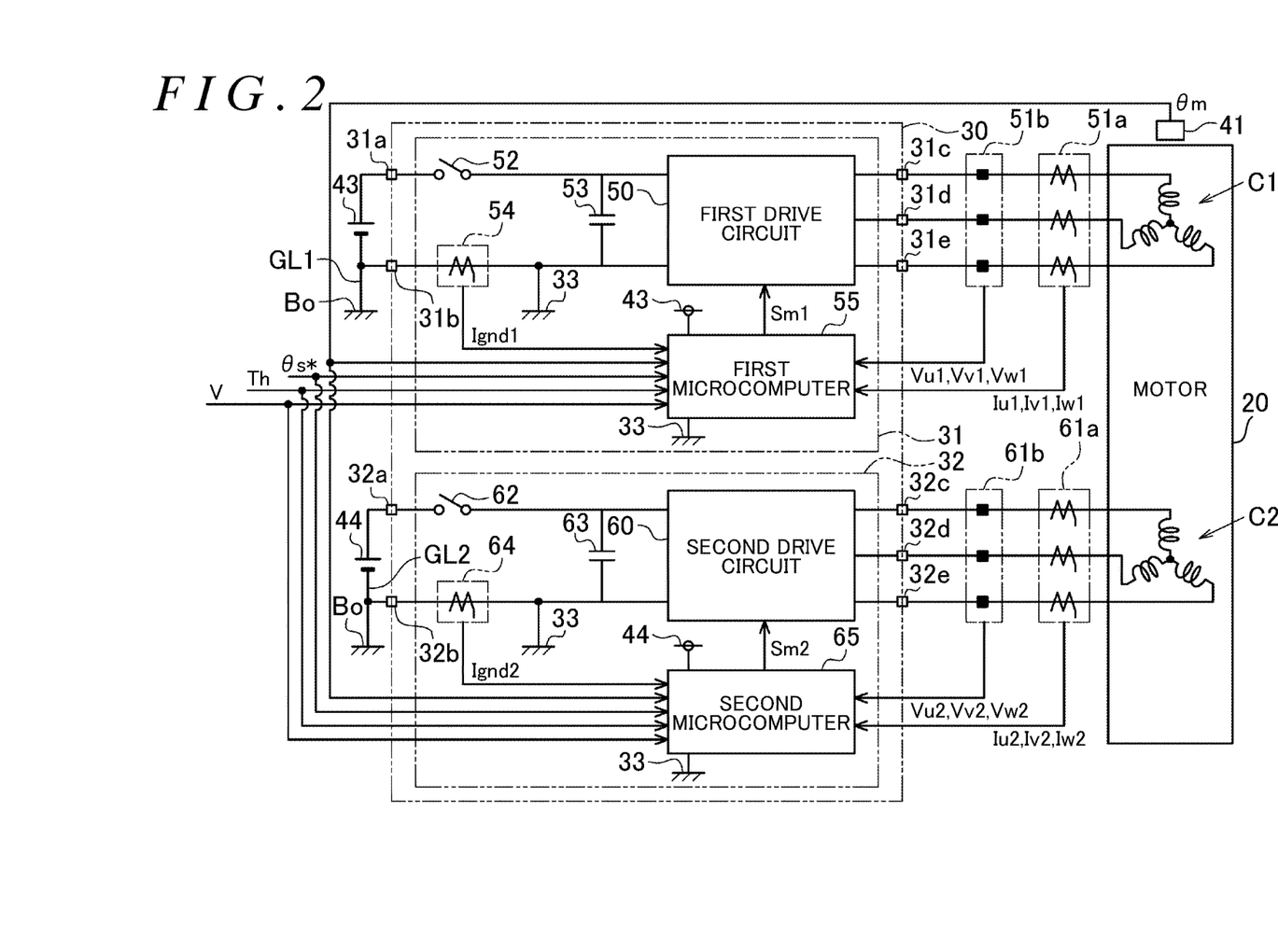
FIG. 2 is a block diagram illustrating the electric configuration of an automatic steering device according to a first embodiment.

Next, the electric configuration of the automatic steering device 1 will be described. As illustrated in FIGS. 1 and 2, the steering ECU 30 includes a first control system 31 that supplies drive electric power to a first system coil C1 of the motor 20, and a second control system 32 that supplies drive electric power to a second system coil C2 of the motor 20.

The first external power source 43 is connected to the first control system 31 through a connector 31a as an electric power source of drive electric power to be supplied to the first system coil C1. The first control system 31 and the low potential side of the first external power source 43 are connected to each other via a first power source ground line GL1 which is a power source ground connected through a connector 31b. The first control system 31 and the first system coil C1 are connected to each other through connectors 31c, 31d, and 31e.

The second external power source 44 is connected to the second control system 32 through a connector 32a as an electric power source of drive electric power to be supplied to the second system coil C2. The second control system 32 and the low potential side of the second external power source 44 are connected to each other via a second power source ground line GL2 which is a power source ground connected through a connector 32b. The power source ground lines GL1 and GL2 are grounds (so-called "frame grounds") connected to a body Bo of the vehicle A, and have substantially equal potentials. The second control system 32 and the second system coil C2 are connected to each other through connectors 32c, 32d, and 32e.

In this way, different external power sources are connected to the control systems 31 and 32 as electric power sources of drive electric power via independent power source ground lines. That is, in the embodiment, the redundancy of the control system related to drive of the motor 20 is increased, and the redundancy of the electric power source of drive electric power to be supplied to the motor 20 is increased. In the system coils C1 and C2, coils for the respective phases are disposed alternately system by system along the periphery of the motor 20, coils for the respective phases are disposed collectively side by side along the periphery of the motor 20, or coils for the respective phases are disposed on the same teeth as stacked in the radial direction of the motor 20.

The configuration A of the control systems 31 and 32 will be described in detail. As illustrated in FIG. 2, the first control system 31 has a first drive circuit 50 that operates to supply electric power to the first system coil C1. The first drive circuit 50 has a plurality of metal oxide semiconductor (MOS) field effect transistors (switching elements) classified into transistors. The first drive circuit 50 is constituted as a well-known three-phase inverter in which a series circuit of three sets of a pair of upper and lower switching elements is defined as a basic unit (switching arm) and such switching arms are connected in parallel to each other. The upstream side of the pair of switching elements opens and closes a connection between the high potential side of the first external power source 43 and the first system coil C1. The downstream side of the pair of switching elements opens and closes a connection between the low potential side of the first external power source 43 and the first system coil C1. A current sensor 51a is provided between the first drive circuit 50 and the motor 20 to detect each of current values Iu1, Iv1, and Iw1 for the respective phases as actual currents of the first system coil C1. In addition, a voltage sensor 51b is provided between the first drive circuit 50 and the motor 20 to detect each of voltage values Vu1, Vv1, and Vw1 for the respective phases as voltages applied to the first system coil C1. The current sensor 51a and the voltage sensor 51b use a shunt resistor, for example.

A first power source relay 52 is provided between the high potential side of the first external power source 43 and the first drive circuit 50 (the upstream side of the pair of switching elements) to switch on and off the power supply from the first external power source 43 to the first drive circuit 50. The first power source relay 52 is normally maintained in the on state. In the first control system 31, in the case where a ground abnormality such as a short circuit is caused in the first power source ground line GL1, the first power source relay 52 is switched to the off state. In the off state, the power supply to the first drive circuit 50 is blocked, and the power supply from the first external power source 43 to the first system coil C1 is also blocked. A smoothing capacitor 53 is provided between the first drive circuit 50 and the first external power source 43 to smooth drive electric power supplied from the first external power source 43.

In the first drive circuit 50, the low potential side, which is the downstream side, of the pair of switching elements is connected to an internal ground 33 (so-called "signal ground") provided on a substrate that serves as a base of the steering ECU 30.

In addition, a first current detection circuit 54 is provided between the low potential side of the first drive circuit 50 and the connector 32b to detect a first power source ground current value Ignd1 as an actual current of the first power source ground line GL1. That is, the first current detection circuit 54 is provided between the internal ground 33 and the first power source ground line GL1. The first current detection circuit 54 is constituted of a current sensor that is similar to the current sensor 51a, and uses a shunt resistor, for example. In the embodiment, in the case where a ground abnormality is not caused in the first control system 31, the first power source ground current value Ignd1 is substantially equal (in practice, with a tolerance due to various components) to a first power source current value Iba1 of the first external power source 43.

In addition, the first control system 31 has a first microcomputer 55 that controls operation of the first drive circuit 50 and the first power source relay 52. The first microcomputer 55 receives, as inputs, the external command value θs*, the steering torque Th, the vehicle speed V, the rotational angle θm, the current values Iu1, Iv1, and Iw1 for the respective phases, the voltage values Vu1, Vv1, and Vw1 for the respective phases, and the first power source ground current value Ignd1. The first microcomputer 55 outputs a first motor control signal Sm1 such as a pulse width modulation (PWM) signal. The first motor control signal Sm1 prescribes the on duty ratio of the switching elements which constitute the first drive circuit 50. The first microcomputer 55 is connected to the first external power source 43, and connected to the internal ground 33 as with the low potential side of the first drive circuit 50.

In addition, as illustrated in FIG. 2, the second control system 32 basically has the same structure as that of the first control system 31, and has a second drive circuit 60 that operates to supply electric power to the second system coil C2. A current sensor 61a is provided between the second drive circuit 60 and the motor 20 to detect each of current values Iu2, Iv2, and Iw2 for the respective phases as actual currents of the second system coil C2. In addition, a voltage sensor 61b is provided between the second drive circuit 60 and the motor 20 to detect each of voltage values Vu2, Vv2, and Vw2 for the respective phases as voltages applied to the second system coil C2. The current sensor 61a and the voltage sensor 61b use a shunt resistor, for example.

A second power source relay 62 is provided between the high potential side of the second external power source 44 and the second drive circuit 60 (the upstream side of the pair of switching elements) to switch on and off the power supply from the second external power source 44 to the second drive circuit 60. When the second power source relay 62 is in the off state, the power supply to the second drive circuit 60 is blocked, and the power supply from the second external power source 44 to the second system coil C2 is also blocked. A smoothing capacitor 63 is provided between the second drive circuit 60 and the second external power source 44 to smooth drive electric power supplied from the second external power source 44.

The low potential side of the second drive circuit 60 is connected to the internal ground 33 as with the low potential side of the first drive circuit 50 and the first microcomputer 55. That is, the low potential sides of the drive circuits 50 and 60 are connected to each other via the common internal ground 33.

In addition, a second current detection circuit 64 is provided between the low potential side of the second drive circuit 60 and the connector 32b to detect a second power source ground current value Ignd2 as an actual current of the second power source ground line GL2. That is, the second current detection circuit 64 is provided between the internal ground 33 and the second power source ground line GL2. The second current detection circuit 64 is constituted of a current sensor that is similar to the current sensor 61a, and uses a shunt resistor, for example. In the embodiment, in the case where a ground abnormality is not caused in the second control system 32, the second power source ground current value Ignd2 is substantially equal (in practice, with a tolerance due to various components) to a second power source current value Iba2 of the second external power source 44.

In addition, the second control system 32 has a second microcomputer 65 that controls operation of the second drive circuit 60 and the second power source relay 62. The second microcomputer 65 receives, as inputs, the external command value θs*, the steering torque Th, the vehicle speed V, the rotational angle θm, the current values Iu2, Iv2, and Iw2 for the respective phases, the voltage values Vu2, Vv2, and Vw2 for the respective phases, and the second power source ground current value Ignd2. The second microcomputer 65 outputs a second motor control signal Sm2 such as a PWM signal. The second motor control signal Sm2 prescribes the on duty ratio of the switching elements which constitute the second drive circuit 60. The second microcomputer 65 is connected to the second external power source 44, and connected to the internal ground 33 as with the low potential side of the second drive circuit 60, the first microcomputer 55, and so forth. This enables inter-microcomputer communication between the microcomputers 55 and 65.

Figure 3:
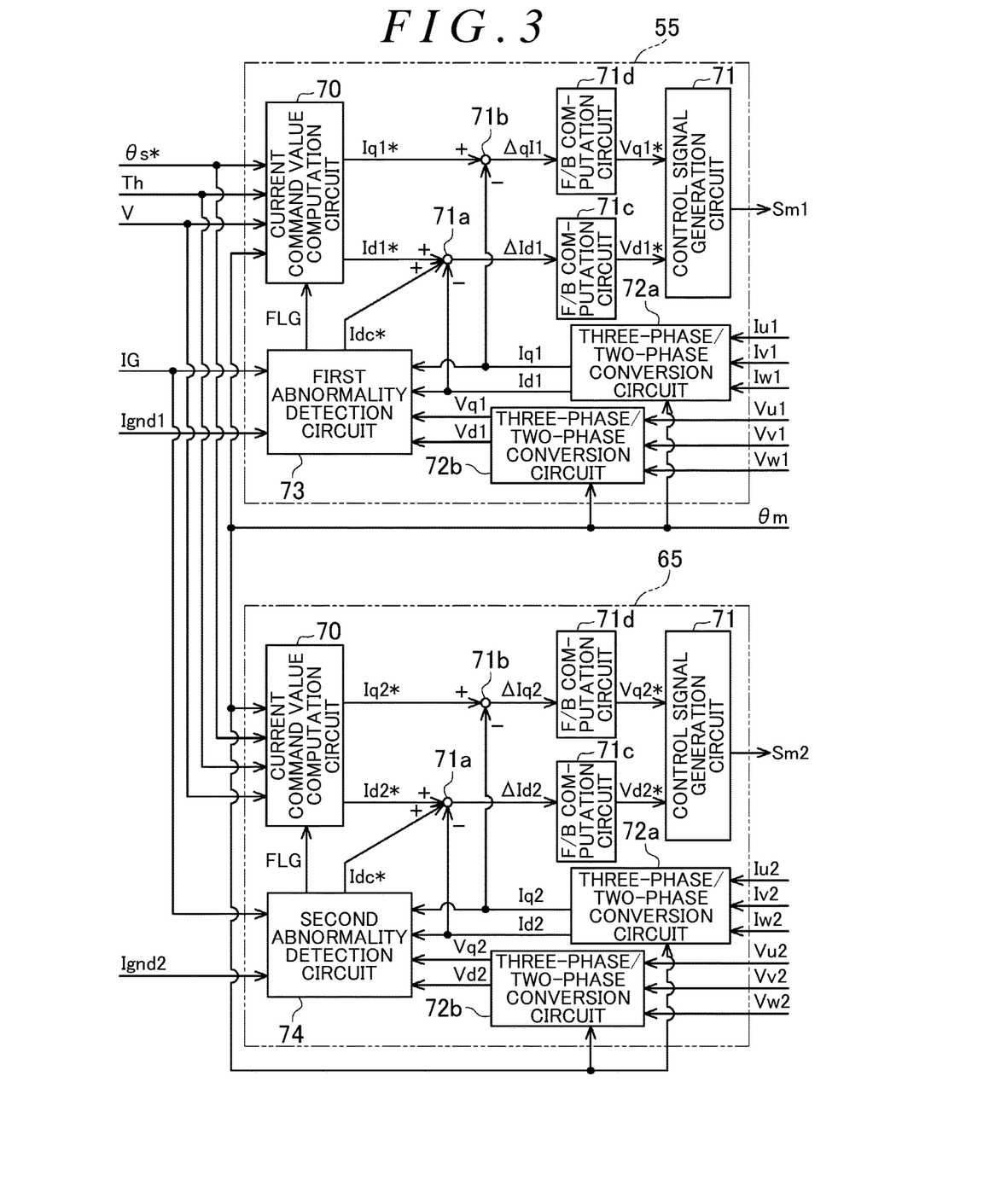
FIG. 3 is a block diagram illustrating the configuration of a first microcomputer and a second microcomputer of a steering electronic control unit (ECU) according to the first embodiment.

Next, the functions of the microcomputers 55 and 65 will be described in detail. As illustrated in FIG. 3, the microcomputer 55 has a current command value computation circuit 70 that computes a d-axis current command value Id1* and a q-axis current command value Iq1* for generating the motor control signal Sm1. The microcomputer 65 has a current command value computation circuit 70 that computes a d-axis current command value Id2* and a q-axis current command value Iq2* for generating the motor control signal Sm2. The microcomputer 55 also has a control signal generation circuit 71 that generates the motor control signal Sm1 on the basis of the d-axis current command value Id1* and the q-axis current command value Iq1* which are computed through the current command value computation circuit 70 and that outputs the motor control signal Sm1 as a PWM signal. The microcomputer 65 also has a control signal generation circuit 71 that generates the motor control signal Sm2 on the basis of the d-axis current command value Id2* and the q-axis current command value Iq2* which are computed through the current command value computation circuit 70 and that outputs the motor control signal Sm2 as a PWM signal.

The microcomputers 55 and 65 internally execute the same process except that different electric signals are input and output. Therefore, for convenience, the function of the first microcomputer 55 will be mainly described below. It should be noted, however, that the respective functions of the microcomputers 55 and 65 will be described individually in case of necessity.

The first microcomputer 55 has a three-phase/two-phase conversion circuit 72a that computes a d-axis current value Id1 and a q-axis current value Iq1 by mapping the current values Iu1, Iv1, and Iw1 for the respective phases onto a dq coordinate system using the rotational angle θm. The d-axis current value Id1 and the q-axis current value Iq1 are actual currents of the first system coil C1 (motor 20) in the dq coordinate system. The first microcomputer 55 also has a three-phase/two-phase conversion circuit 72b that computes a d-axis voltage value Vd1 and a q-axis voltage value Vq1 by mapping the voltage values Vu1, Vv1, and Vw1 for the respective phases onto the dq coordinate system using the rotational angle θm. The d-axis voltage value Vd1 and the q-axis voltage value Vq1 are voltages applied to the first system coil C1 (motor 20) in the dq coordinate system.

The three-phase/two-phase conversion circuit 72a of the second microcomputer 65 computes a d-axis current value Id2 and a q-axis current value Iq2 by mapping the current values Iu2, Iv2, and Iw2 for the respective phases onto the dq coordinate system using the rotational angle θm. The d-axis current value Id2 and the q-axis current value Iq2 are actual currents of the second system coil C2 (motor 20) in the dq coordinate system. The three-phase/two-phase conversion circuit 72b of the second microcomputer 65 computes a d-axis voltage value Vd2 and a q-axis voltage value Vq2 by mapping the voltage values Vu2, Vv2, and Vw2 for the respective phases onto the dq coordinate system. The d-axis voltage value Vd2 and the q-axis voltage value Vq2 are voltages applied to the second system coil C2 (motor 20) in the dq coordinate system.

The first microcomputer 55 also has a first abnormality detection circuit 73 that detects, in the case where a ground abnormality is caused in the steering ECU 30, occurrence of the ground abnormality. The second microcomputer 65 has a second abnormality detection circuit 74 that detects, in the case where a ground abnormality is caused in the steering ECU 30, occurrence of the ground abnormality. In the embodiment, the abnormality detection circuits 73 and 74 also detect, when a ground abnormality is detected, which of the control systems 31 and 32 the ground abnormality is caused in.

The current command value computation circuit 70 computes target torque using the external command value θs* or the steering torque Th and the vehicle speed V, and computes the d-axis current command value Id1* and the q-axis current command value Iq1* on the basis of the computed target torque.

Specifically, in the case where the external command value θs* is input, the current command value computation circuit 70 computes target torque to be generated by the motor 20 on the basis of a rotational angle command value θm* obtained as a result of a conversion and the rotational angle θm which is detected by the rotational angle sensor 41 at that time. Meanwhile, in the case where the steering torque Th is input, the current command value computation circuit 70 computes target torque for assist torque to be generated by the motor 20 on the basis of the steering torque Th and the vehicle speed V. That is, the steering operation by the user is assisted in accordance with the assist torque.

In the case where automatic steering control is executed, the automatic steering ECU 4 executes target rotational angle computation, in which the external command value θs* which is optimum for controlling the behavior of the vehicle A is generated on the basis of the vehicle information θcon, in predetermined cycles. The external command value θs* is a target value in automatic steering control for a rotational angle that can be converted into the steered angle of the steered wheels 15, e.g. a steering angle θs which is the rotational angle of the steering wheel 10. The automatic steering ECU 4 outputs the generated external command value θs* to the microcomputers 55 and 65 of the steering ECU 30 in predetermined cycles. The microcomputers 55 and 65 control drive of the motor 20 on the basis of the external command value θs*. The microcomputers 55 and 65 convert the external command value θs* which is input in predetermined cycles into the rotational angle command value θm* which is related to the rotational angle θm of the motor 20 using a predetermined conversion coefficient. In this way, the rotational angle which can be converted into the steered angle of the steered wheels 15 and the rotational angle θm of the motor 20 are correlated with each other, and can be converted into each other.

In the case where interventional steering control is not executed during execution of automatic steering control, the current command value computation circuit 70 computes target torque based on the rotational angle command value θm* and the rotational angle θm. In the case where interventional steering control is executed along with automatic steering control, on the other hand, the current command value computation circuit 70 determines the sum of target torque based on the rotational angle command value θm* and the rotational angle θm and target torque based on the first steering torque Th as target torque. In the case where EPS control is executed, the current command value computation circuit 70 computes target torque based on the steering torque Th.

The control systems 31 and 32 are adapted to operate in synchronization with each other (operate in phase with each other). Basically, the same amount of drive electric power is supplied to the respective phases of the system coils C1 and C2 at the same timing. That is, target torque is computed such that the microcomputers 55 and 65 compute equal target torque and the system coils C1 and C2 generate target torque (100%) altogether. Specifically, target torque for generating torque in each of the system coils C1 and C2 corresponding to half (50%) the torque to be actually generated by the motor 20 is computed. The current command value computation circuit 70 outputs the d-axis current command value Id1* and the q-axis current command value Iq1* which have been computed to subtractors 71a and 71b, respectively. The d-axis current command value Id1* and the q-axis current command value Iq1* correspond to target values for a current supplied to the first system coil C1 (motor 20) in the dq coordinate system.

The three-phase/two-phase conversion circuit 72a outputs the d-axis current value Id1 and the q-axis current value Iq1 which have been computed to the subtractors 71a and 71b, respectively. The subtractor 71a outputs a deviation ΔId1 between the d-axis current command value Id1* and the d-axis current value Id1 to a feedback computation circuit (hereinafter referred to as an "F/B computation circuit") 71c. The F/B computation circuit 71c generates a d-axis voltage command value by executing feedback control based on the deviation ΔId1 such that the d-axis current value Id1 follows the d-axis current command value Id1*, and outputs the generated d-axis voltage command value Vd1* to the control signal generation circuit 71.

Meanwhile, the subtractor 71b outputs a deviation ΔIq1 between the q-axis current command value Iq1* and the q-axis current value Iq1 to a feedback computation circuit (hereinafter referred to as an "F/B computation circuit") 71d. The F/B computation circuit 71d generates a q-axis voltage command value Vq1* by executing feedback control based on the deviation ΔIq1 such that the q-axis current value Iq1 follows the q-axis current command value Iq1*, and outputs the generated q-axis voltage command value Vq1* to the control signal generation circuit 71.

The control signal generation circuit 71 computes voltage command values Vu1*, Vv1*, and Vw1* in a three-phase coordinate system by mapping the d-axis voltage command value Vd1* and the q-axis voltage command value Vq1* onto the three-phase coordinate system using the rotational angle θm. In addition, the control signal generation circuit 71 generates the first motor control signal Sm1 corresponding to the computed voltage command values Vu1*, Vv1*, and Vw1* for the respective phases, and outputs the generated first motor control signal Sm1 to the first drive circuit 50.

In addition, as illustrated in FIG. 3, the first abnormality detection circuit 73 receives, as inputs, the ignition signal IG and, in the first control system 31, the first power source ground current value Ignd1, the d-axis current value Id1, the q-axis current value Iq1, the d-axis voltage value Vd1, and the q-axis voltage value Vq1. The first abnormality detection circuit 73 detects a ground abnormality on the basis of the difference between the first power source current value Iba1, which is estimated and computed from the d-axis current value Id1, the q-axis current value Iq1, the d-axis voltage value Vd1, and the q-axis voltage value Vq1, and the first power source ground current value Ignd1, and outputs the detection results to the current command value computation circuit 70 as a ground abnormality FLG.

Meanwhile, the second abnormality detection circuit 74 receives, as inputs, the ignition signal IG and, in the second control system 32, the second power source ground current value Ignd2, the d-axis current value Id2, the q-axis current value Iq2, the d-axis voltage value Vd2, and the q-axis voltage value Vq2. The second abnormality detection circuit 74 detects a ground abnormality on the basis of the difference between the second power source current value Iba2, which is estimated and computed from the d-axis current value Id2, the q-axis current value Iq2, the d-axis voltage value Vd2, and the q-axis voltage value Vq2, and the second power source ground current value Ignd2, and outputs the detection results to the current command value computation circuit 70 as a ground abnormality FLG.

The ground abnormality FLG is output in the case where a ground abnormality is caused. A value of "1" is output in the case where the ground abnormality is caused in the first control system 31. A value of "2" is output in the case where the ground abnormality is caused in the second control system 32.

For example, in the case where a ground abnormality is not caused in the first control system 31, the first power source ground current value Ignd1 is substantially equal to the first power source current value Iba1 of the first external power source 43. In the case where a ground abnormality is caused in the first control system 31, on the other hand, the first power source ground current value Ignd1 is in a characteristic state in which the first power source ground current value Ignd1 is smaller than the first power source current value Iba1 with no current flowing into the first power source ground line GL1. In the case where a ground abnormality is caused in the second control system 32, meanwhile, the first power source ground current value Ignd1 is in a characteristic state in which the first power source ground current value Ignd1 is larger than the first power source current value Iba1 with a current for the second control system 32 flowing into the first power source ground line GL1 via the internal ground 33. This also applies to the second power source ground current value Ignd2.

That is, the abnormality detection circuits 73 and 74 can detect a ground abnormality in the steering ECU 30 using only information related to the control system in which the abnormality detection circuit itself is provided and, when a ground abnormality is detected, can detect which of the control systems 31 and 32 the ground abnormality is caused in.

Figure 4:
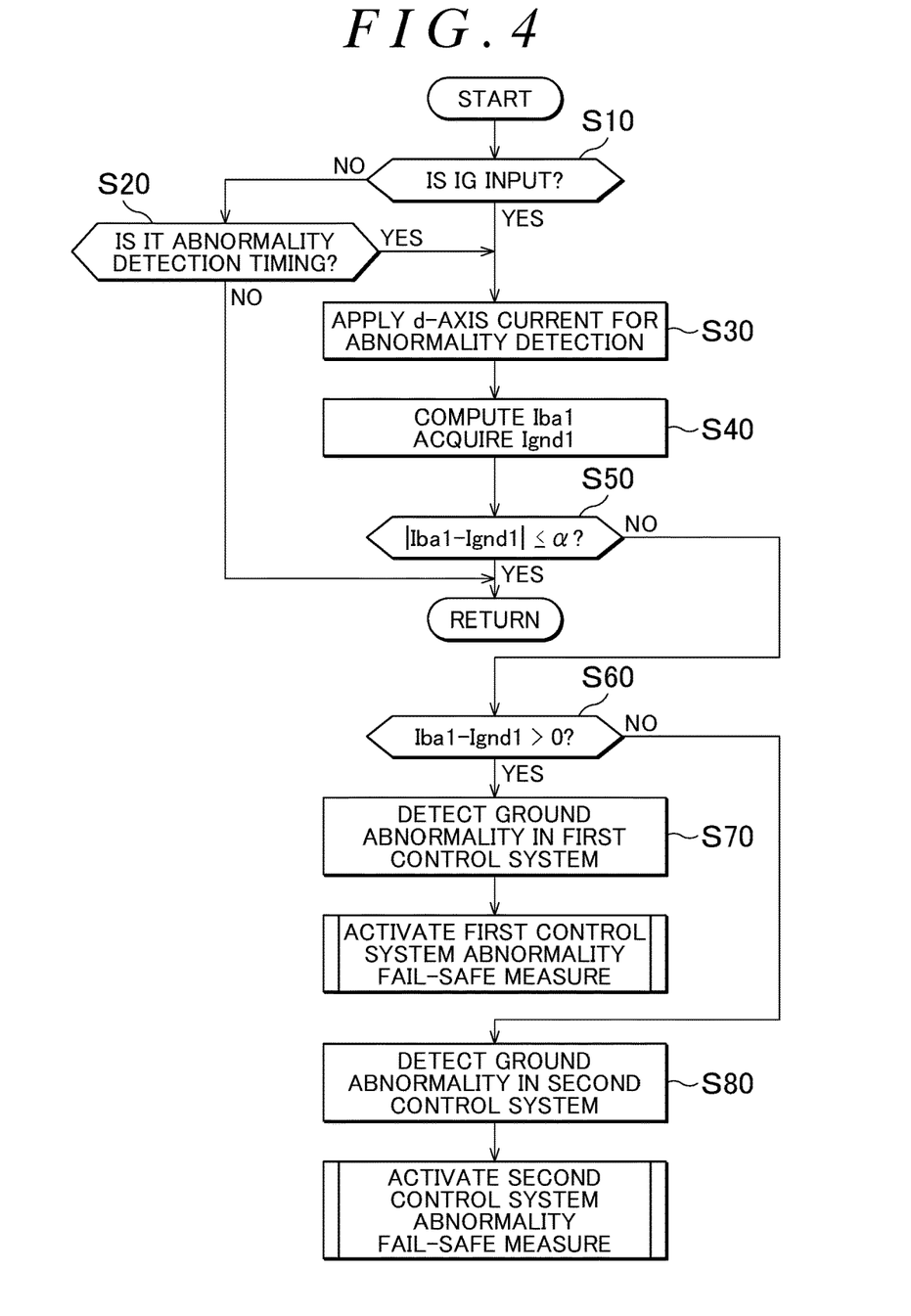
FIG. 4 is a flowchart illustrating an abnormality detection process according to the first embodiment.

An abnormality detection process executed by the abnormality detection circuits 73 and 74 will be described in detail. The abnormality detection circuits 73 and 74 repeatedly execute the process described below in predetermined cycles. The abnormality detection circuits 73 and 74 execute the abnormality detection process separately. In the following, for convenience, the process executed by the first abnormality detection circuit 73 is mainly described, and the process executed by the second abnormality detection circuit 74 is described in a simplified manner.

As illustrated in FIG. 4, the first abnormality detection circuit 73 determines whether or not the ignition signal IG is input (S10). In the case where the ignition signal IG is not input (S10: NO), the first abnormality detection circuit 73 determines whether or not it is an abnormality detection timing (S20). In S20, after the ignition signal IG is input, the first abnormality detection circuit 73 determines, on the basis of a timer managed inside the first microcomputer 55, whether or not it is an abnormality detection timing that comes regularly (e.g. in four control cycles). In the case where it is not an abnormality detection timing (S20: NO), the first abnormality detection circuit 73 ends the abnormality detection process.

In the case where the ignition signal IG is input (S10: YES), or in the case where it is an abnormality detection timing although the ignition signal IG is not input (S20: YES), on the other hand, the first abnormality detection circuit 73 applies a d-axis current for abnormality detection in order to detect a ground abnormality (S30). In the case where the ignition signal IG is input, that is, during a process to start the steering ECU 30 which corresponds to a stage for preparation to drive the motor 20, the first abnormality detection circuit 73 executes various processes to detect a ground abnormality. After the ignition signal IG is input, the first abnormality detection circuit 73 regularly executes various processes to detect a ground abnormality.

In S30, as illustrated in FIG. 3, the first abnormality detection circuit 73 applies a d-axis current for abnormality detection by outputting the d-axis current command value Idc* to the subtractor 71*a* to be added to the d-axis current command value Id1*. Consequently, even in a state in which a current is not flowing in the first control system 31 and the electric circuit of the first control system 31 is not in operation, it is possible to intentionally create a state in which a current is flowing in the first control system 31 and the electric circuit of the first control system 31 is in operation. The d-axis current command value Idc* is set to a value empirically obtained as a value at which a ground abnormality can be detected. A d-axis current is a current that does not contribute to generation of torque in control of a surface permanent magnet synchronous motor (SPMSM), and is controlled to zero from the viewpoint of highly efficient drive. For example, in the case where torque generated by the motor 20 is zero, both the d-axis current value Id1 and the q-axis current value Iq1 are zero, and the electric circuit of the first control system 31 is not in operation. In this case, application of a d-axis current achieves a state in which the electric circuit of the first control system 31 is in operation without causing the motor 20 to generate torque. This situation corresponds to the process to start the steering ECU 30 and straight forward travel of the vehicle A.

Similarly, in the case where the ignition signal IG is input, that is, during a process to start the second microcomputer 65, the second abnormality detection circuit 74 executes various processes to detect a ground abnormality. After the ignition signal IG is input, the second abnormality detection circuit 74 regularly executes various processes to detect a ground abnormality. In addition, in the case where the ignition signal IG is input, or in the case where it is an abnormality detection timing although the ignition signal IG is not input, the second abnormality detection circuit 74 applies a d-axis current for abnormality detection in order to detect a ground abnormality.

Next, the first abnormality detection circuit 73 computes the first power source current value Iba1, and acquires the first power source ground current value Ignd1 (S40). In S40, the first abnormality detection circuit 73 computes the first power source current value Iba1 on the basis of the d-axis current value Id1 and the q-axis current value Iq1 which are output from the three-phase/two-phase conversion circuit 72*a* and the d-axis voltage value Vd1 and the q-axis voltage value Vq1 which are output from the three-phase/two-phase conversion circuit 72*b*. Here, the following formula (c1) which correlates the power source current value Iba and the d-axis current value Id, the q-axis current value Iq, the d-axis voltage value Vd, and the q-axis voltage value Vq is utilized.

$$Iba=(Id\cdot Vd+Iq\cdot Vq)/Vba \quad (c1)$$

In the formula (c1) above, Id·Vd+Iq·Vq is drive electric power (input electric power) supplied to the motor, and Vba is a power source voltage value of the external power source. That is, in the first control system 31, the drive electric power supplied to the motor 20 is Id2·Vd2+Iq2·Vq2, and the power source voltage value is Vba1. The power source voltage value Vba1 can be directly detected by the first microcomputer 55 which is connected to the first external power source 43. In the second control system 32, meanwhile, the drive electric power which is supplied to the motor 20 is Id2·Vd2+Iq2·Vq2, and the power source voltage value is Vba2. The power source voltage value Vba2 can be directly detected by the second microcomputer 65 which is connected to the second external power source 44.

Subsequently, the first abnormality detection circuit 73 determines whether or not the absolute value (|Iba1−Ignd1|) of the difference between the first power source current value Iba1 which is computed using the formula (c1) above and the first power source ground current value Ignd1 is equal to or less than a threshold α (S50). In S50, the first abnormality detection circuit 73 determines whether or not a current drawn from the first external power source 43 is flowing into the first power source ground line GL1. The threshold α is set to a value obtained by increasing and decreasing the tolerance due to various components in the control systems 31 and 32 with respect to zero in consideration of the tolerance. A current based on the motor input electric power obtained as the sum for the control systems 31 and 32 actually flows in the entire steering ECU 30. It should be noted, however, that in the embodiment, only a current based on the motor input electric power for each of the control systems 31 and 32 is taken into consideration in S50 in view of the fact that the control systems 31 and 32 operate in synchronization with each other.

Similarly, the second abnormality detection circuit 74 computes the second power source current value Iba2 on the basis of the d-axis current value Id2 and the q-axis current value Iq2 which are output from the three-phase/two-phase conversion circuit 72a and the d-axis voltage value Vd2 and the q-axis voltage value Vq2 which are output from the three-phase/two-phase conversion circuit 72b. Then, the second abnormality detection circuit 74 determines whether or not the absolute value (|Iba2−Ignd2|) of the difference between the second power source current value Iba2 which is computed using the formula (c1) above and the second power source ground current value Ignd2 is equal to or less than the threshold α.

In the case where the absolute value of the difference between the first power source current value Iba1 and the first power source ground current value Ignd1 is equal to or less than the threshold α (S50: YES), the first abnormality detection circuit 73 ends the abnormality detection process. In this case, the first abnormality detection circuit 73 does not output an abnormality detection FLG since a ground abnormality is not caused.

In the case where the absolute value of the difference between the first power source current value Iba1 and the first power source ground current value Ignd1 is not equal to or less than the threshold α (S50: NO), on the other hand, the first abnormality detection circuit 73 determines whether or not the result (Iba1−Ignd1) of subtracting the first power source ground current value Ignd1 from the first power source current value Iba1 is larger than zero (S60). In the case of S50: NO, the first abnormality detection circuit 73 has detected a ground abnormality. Then, in S60, the first abnormality detection circuit 73 specifies which of the control systems 31 and 32 the ground abnormality is caused in.

In the case where the result of subtracting the first power source ground current value Ignd1 from the first power source current value Iba1 is larger than zero (S60: YES), the first abnormality detection circuit 73 determines that a current corresponding to the first power source current value Iba1 is not flowing into the first power source ground line GL1, and detects that the ground abnormality is caused in the first control system 31 (S70). In this case, the first abnormality detection circuit 73 outputs an abnormality detection FLG with a value of "1" which indicates that a ground abnormality is caused in the first control system 31, and transitions to a process of activating a first control system abnormality fail-safe measure. In the first control system abnormality fail-safe measure, the first microcomputer 55 switches the first power source relay 52 to the off state, and the first microcomputer 55 invalidates the external command value θs* (brings the external command value θs* to zero).

In the case where the result of subtracting the first power source ground current value Ignd1 from the first power source current value Iba1 is smaller than zero (S60: NO), on the other hand, the first abnormality detection circuit 73 determines that a current for the second control system 32 is flowing into the first power source ground line GL1, and detects that the ground abnormality is caused in the second control system 32 (S80). In this case, the first abnormality detection circuit 73 outputs an abnormality detection FLG with a value of "2" which indicates that a ground abnormality is caused in the second control system 32, and transitions to a process of activating a second control system abnormality fail-safe measure. In the second control system abnormality fail-safe measure, the first microcomputer 55 maintains the first power source relay 52 in the on state, and the first microcomputer 55 invalidates the external command value θs* (brings the external command value θs* to zero).

Similarly, in the case where the absolute value of the difference between the second power source current value Iba2 and the second power source ground current value Ignd2 is equal to or less than the threshold α, the second abnormality detection circuit 74 does not output an abnormality detection FLG since a ground abnormality is not caused. In the case where the absolute value of the difference between the second power source current value Iba2 and the second power source ground current value Ignd2 is not equal to or less than the threshold α, on the other hand, the second abnormality detection circuit 74 determines that a ground abnormality is detected, and specifies which of the control systems 31 and 32 the ground abnormality is caused in on the basis of the results of subtracting the second power source ground current value Ignd2 from the second power source current value Iba2.

In the case where the fact that the ground abnormality is caused in the second control system 32 is detected, the second abnormality detection circuit 74 outputs an abnormality detection FLG with a value of "2" which indicates that a ground abnormality is caused in the second control system 32, and transitions to a process of activating the second control system abnormality fail-safe measure. In the second control system abnormality fail-safe measure, the second microcomputer 65 switches the second power source relay 62 to the off state, and the second microcomputer 65 invalidates the external command value θs* (brings the external command value θs* to zero). In the case where the ground abnormality is detected to be caused in the first control system 31, on the other hand, the second abnormality detection circuit 74 outputs an abnormality detection FLG with a value of "1" which indicates that a ground abnormality is caused in the first control system 31, and transitions to a process of activating the first control system abnormality fail-safe measure. In the first control system abnormality fail-safe measure, the second microcomputer 65 maintains the second power source relay 62 in the on state, and the second microcomputer 65 invalidates the external command value θs* (brings the external command value θs* to zero).

In this way, in the first control system abnormality fail-safe measure, control of drive of the motor 20 by the first control system 31 is stopped, and a transition is made to a state in which drive of the motor 20 is controlled by only the second control system 32. In the second control system abnormality fail-safe measure, meanwhile, control of drive of the motor 20 by the second control system 32 is stopped, and a transition is made to a state in which drive of the motor 20 is controlled by only the first control system 31. In either state, automatic steering control itself is not executed, that is, EPS control is executed.

With the embodiment described above, the following functions and effects are obtained.

(1) In the embodiment, when a ground abnormality is caused, the control systems can be connected to the remaining normal power source ground line, that is, the control system which has been connected to the power source ground line in which an abnormality is caused is allowed to operate normally through the remaining normal power source ground line. Consequently, a characteristic state is observed in the power source ground currents when a ground abnormality is caused.

That is, with the embodiment, in the case where a ground abnormality is caused, a characteristic state of the power source ground current value Ignd1 can be detected on the basis of the results of detection performed by the current detection circuit 54 which is provided in the control system 31, and a characteristic state of the power source ground current value Ignd2 can be detected on the basis of the results of detection performed by the current detection circuit 64 which is provided in the control system 32. In addition, the current detection circuit 54 is provided between the power source ground line GL1 and the internal ground 33, and the current detection circuit 64 is provided between the power source ground line GL2 and the internal ground 33. Thus, characteristic states of the power source ground current values Ignd1 and Ignd2 can be detected individually for the power source ground lines GL1 and GL2, respectively. Consequently, a ground abnormality can be detected suitably by monitoring the results of detection performed by the current detection circuits 54 and 64 of the control systems 31 and 32 of the steering ECU 30.

In the case where a ground abnormality is actually detected, the first control system abnormality fail-safe measure or the second control system abnormality fail-safe measure is activated to stop operation of the control system which has been connected to the power source ground line in which an abnormality is caused, and a transition is made to a state in which automatic steering control itself is not executed to immediately address the ground abnormality. Thus, it is possible to suppress a reduction in reliability of the steering ECU 30 as a motor control device and a steering control device even in the case where the redundancy of the electric power source of drive electric power is increased.

(2) Specifically, the first abnormality detection circuit 73 detects a characteristic state of the power source ground current value Ignd1, Ignd2 for a case where a ground abnormality is caused in accordance with the difference between the first power source current value Iba1 and the first power source ground current value Ignd1 (S50 and S60), and detects a ground abnormality on the basis of the detection results. This also applies to the second abnormality detection circuit 74. Consequently, a ground abnormality can be detected with higher accuracy.

In this case, a ground abnormality can be detected in each of the control systems 31 and 32. This is particularly effective from the viewpoint of implementing a function of self-checking a ground abnormality in each of the control systems 31 and 32 in a configuration in which a microcomputer that controls each of the drive circuits 50 and 60 is provided in each of the control systems 31 and 32 as in the embodiment.

(3) In order to detect a ground abnormality, it is necessary to detect a current in the power source ground lines GL1 and GL2. For example, in the case where it is not necessary for the motor 20 to generate torque and thus substantially no drive electric power is supplied to the motor 20, a current in the power source ground lines GL1 and GL2 cannot be detected correctly.

In this respect, in the embodiment, a d-axis current in the dq coordinate system is applied to the motor 20 (S30) in order to detect a ground abnormality is detected. For example, as in the embodiment, in controlling drive of the motor 20 in a surface permanent magnet synchronous motor (SPMSM), in order to minimize consumed electric power with respect to torque generated by the motor 20, the d-axis current which does not contribute to generation of torque of the motor 20 in the dq coordinate system is controlled to zero. In this case, application of a d-axis current would only increase consumed electric power and would not contribute to generation of torque of the motor 20, and can be considered to vary the state of drive of the motor 20 only slightly even if such application was implemented. Therefore, with the embodiment, a ground abnormality can be detected irrespective of the state of drive of the motor 20, including a state in which it is not necessary for the motor 20 to generate torque.

(4) In the embodiment, a ground abnormality is detected during a process to start the motor control device, that is, in a stage for preparation to drive the motor 20. Consequently, a ground abnormality can be detected before the motor 20 is driven, which can contribute to improving the reliability of the steering ECU 30.

Next, a motor control device and a steering control device according to a second embodiment will be described below. Components etc. that are the same as those of the embodiment described already are given the same reference numerals to omit redundant description.

Figure 5:
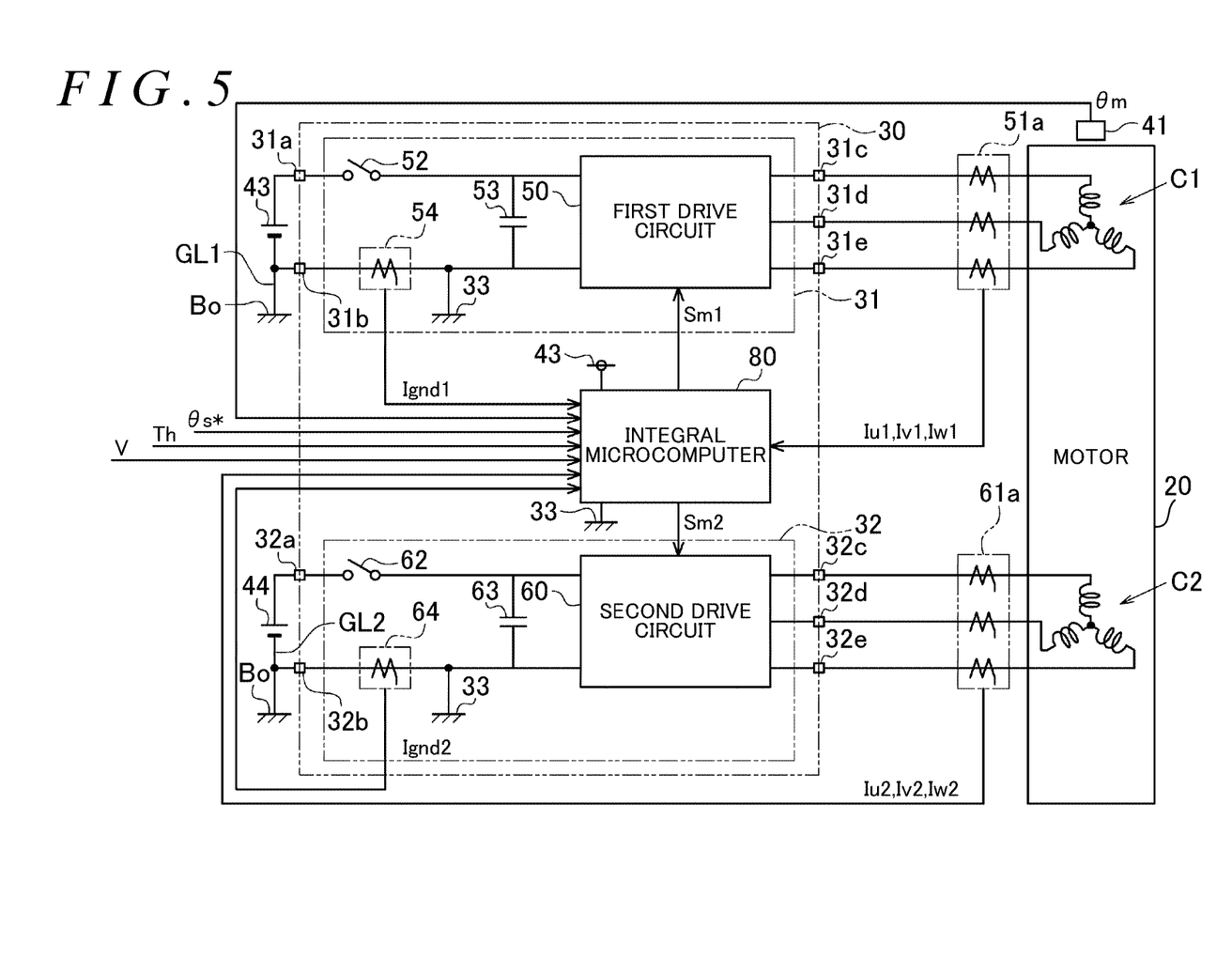
FIG. 5 is a block diagram illustrating the electric configuration of an automatic steering device according to a second embodiment.

As illustrated in FIG. 5, the steering ECU 30 according to the embodiment includes a first control system 31 that supplies drive electric power to a first system coil C1 of the motor 20, a second control system 32 that supplies drive electric power to a second system coil C2 of the motor 20, and an integral microcomputer 80 that integrally controls the control systems 31 and 32 in place of microcomputers 55 and 65. The voltage sensors 51b and 61b are not required for the steering ECU 30 according to the embodiment.

The integral microcomputer 80 controls operation of the drive circuits 50 and 60 and the power source relays 52 and 62 in the control systems 31 and 32. The integral microcomputer 80 receives, as inputs, various information (electric signals) that is, the external command value θs*, the steering torque Th, the vehicle speed V, the rotational angle θm, the current values Iu1, Iv1, Iw1, Iu2, Iv2, and Iw2 for the respective phases, which are input to the microcomputers 55 and 65 in the aforementioned embodiment, and the power source ground current values Ignd1 and Ignd2. The integral microcomputer 80 outputs the motor control signals Sm1 and Sm2 such as PWM signals. The integral microcomputer 80 is connected to the first external power source 43, and connected to the internal ground 33.

Figure 6:
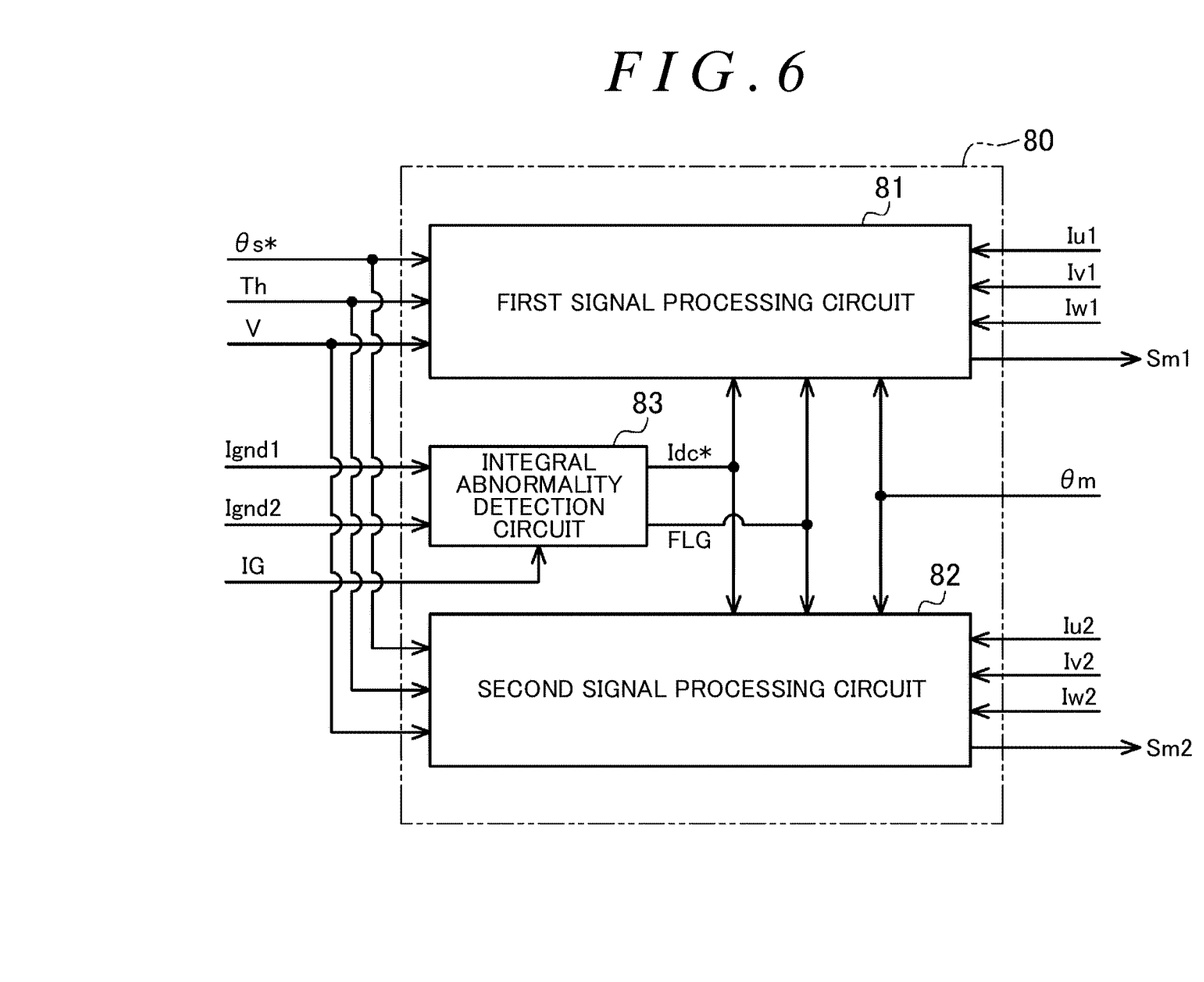
FIG. 6 is a block diagram illustrating the configuration of an integral microcomputer of a steering ECU according to the second embodiment.

As illustrated in FIG. 6, the integral microcomputer 80 has a first signal processing circuit 81 constituted of the current command value computation circuit 70, the control signal generation circuit 71, the subtractors 71a and 71b, the F/B computation circuits 71c and 71d, and the three-phase/two-phase conversion circuit 72a, which are provided in the first microcomputer 55 according to the first embodiment. That is, the first signal processing circuit 81 receives, as inputs, the external command value θs*, the steering torque Th, the vehicle speed V, the rotational angle θm, and the current values Iu1, Iv1, and Iw1 for the respective phases. The three-phase/two-phase conversion circuit 72b is not required for the first signal processing circuit 81 according to the embodiment.

The integral microcomputer 80 also has a second signal processing circuit 82 constituted of the current command value computation circuit 70, the control signal generation circuit 71, the subtractors 71a and 71b, the F/B computation circuits 71c and 71d, and the three-phase/two-phase conversion circuit 72a, which are provided in the second microcomputer 65 according to the first embodiment. That is, the second signal processing circuit 82 receives, as inputs, the external command value θs*, the steering torque Th, the vehicle speed V, the rotational angle θm, and the current values Iu2, Iv2, and Iw2 for the respective phases. The three-phase/two-phase conversion circuit 72b is not required for the second signal processing circuit 82 according to the embodiment.

In the steering ECU 30, the integral microcomputer 80 also has an integral abnormality detection circuit 83 in place of the abnormality detection circuits 73 and 74 according to the first embodiment. The integral abnormality detection circuit 83 also detects, when a ground abnormality is detected, which of the control systems 31 and 32 the ground abnormality is caused in. The integral abnormality detection circuit 83 receives, as inputs, the ignition signal IG and the power source ground current values Ignd1 and Ignd2.

In the case where a ground abnormality is not caused in the steering ECU 30, that is, the control systems 31 and 32, the power source ground current values Ignd1 and Ignd2 are substantially equal to each other in consideration of the fact that the control systems 31 and 32 operate in synchronization with each other. In the case where a ground abnormality is caused in the first control system 31, on the other hand, the power source ground current values Ignd1 and Ignd2 are in a characteristic state in which the first power source ground current value Ignd1 is smaller than the second power source ground current value Ignd2 with no current flowing into the first power source ground line GL1. In the case where a ground abnormality is caused in the second control system 32, meanwhile, the power source ground current values Ignd1 and Ignd2 are in a characteristic state in which the second power source ground current value Ignd2 is smaller than the first power source ground current value Ignd1 with no current flowing into the second power source ground line GL2.

That is, the integral abnormality detection circuit 83 can detect a ground abnormality in the steering ECU 30 using information related to the control systems 31 and 32 and, when a ground abnormality is detected, can detect which of the control systems 31 and 32 the ground abnormality is caused in. The integral abnormality detection circuit 83 detects a ground abnormality on the basis of the difference between the power source ground current values Ignd1 and Ignd2, and outputs the detection results to the current command value computation circuits 70 of the control systems 31 and 32 as a ground abnormality FLG.

Figure 7:
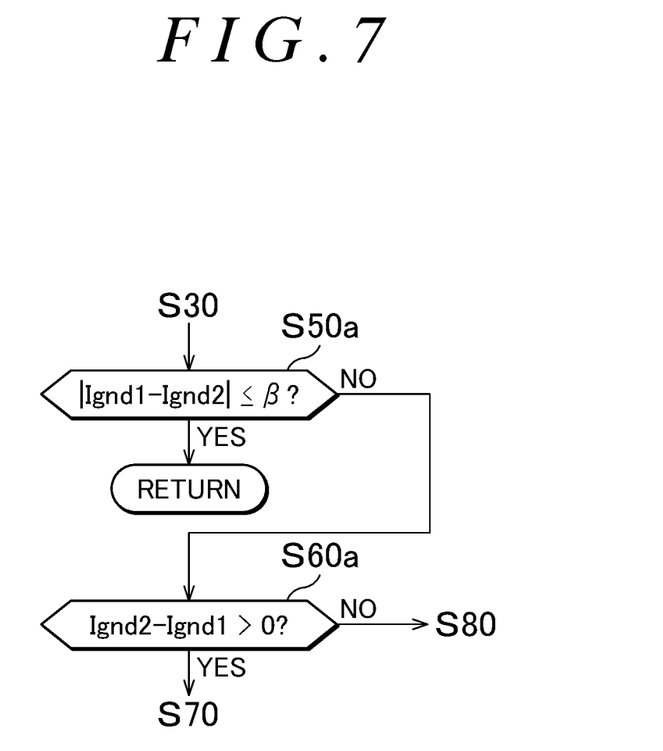
FIG. 7 is a flowchart illustrating an abnormality detection process according to the second embodiment.

In the abnormality detection process, as illustrated in FIGS. 4 and 7, in the case where the ignition signal IG is input or in the case where it is an abnormality detection timing although the ignition signal IG is not input (S10: YES or S20: YES), the integral abnormality detection circuit 83 executes a process for detecting a ground abnormality. That is, the integral abnormality detection circuit 83 applies a d-axis current for abnormality detection in order to detect a ground abnormality (S30). In S30, the integral abnormality detection circuit 83 applies a d-axis current for abnormality detection by outputting the d-axis current command value Idc* to the subtractor 71a of each of the signal processing circuits 81 and 82 to be added to each of the d-axis current command values Id1* and Id2* in the signal processing circuits 81 and 82.

Subsequently, the integral abnormality detection circuit 83 acquires the power source ground current values Ignd1 and Ignd2, and determines whether or not the absolute value (|Ignd1−Ignd2|) of the difference between the power source ground current values Ignd1 and Ignd2 is equal to or less than a threshold β (S50a). In S50a, the integral abnormality detection circuit 83 determines whether or not currents that are substantially equal to each other flow into the power source ground lines GL1 and GL2. The threshold β is set to a value obtained by increasing and decreasing the tolerance due to various components in the control systems 31 and 32 with respect to zero in consideration of the tolerance.

In the case where the absolute value of the difference between the power source ground current values Ignd1 and Ignd2 is equal to or less than the threshold β (S50a: YES), the integral abnormality detection circuit 83 ends the abnormality detection process. In this case, the integral abnormality detection circuit 83 does not output an abnormality detection FLG since a ground abnormality is not caused.

In the case where the absolute value of the difference between the power source ground current values Ignd1 and Ignd2 is not equal to or less than the threshold β (S50a: NO), on the other hand, the integral abnormality detection circuit 83 determines whether or not the result (Ignd2−Ignd1) of subtracting the first power source ground current value Ignd1 from the second power source ground current value Ignd2 is larger than zero (S60a). In the case of S50a: NO, the integral abnormality detection circuit 83 has detected a ground abnormality. Then, in S60a, the integral abnormality detection circuit 83 specifies which of the control systems 31 and 32 the ground abnormality is caused in.

In the case where the result of subtracting the first power source ground current value Ignd1 from the second power source ground current value Ignd2 is larger than zero (S60a: YES), the integral abnormality detection circuit 83 determines that a current that is larger than that flowing into the first power source ground line GL1 is flowing into the second power source ground line GL2, and detects that the ground abnormality is caused in the first control system 31 (S70). In this case, in the first control system abnormality fail-safe measure, the integral microcomputer 80 switches the first power source relay 52 to the off state while maintaining the second power source relay 62 in the on state, and the integral microcomputer 80 invalidates the external command value Os* (brings the external command value θs* to zero).

In the case where the result of subtracting the first power source ground current value Ignd1 from the second power source ground current value Ignd2 is not larger than zero (S60a: NO), on the other hand, the integral abnormality detection circuit 83 determines that a current that is larger than that flowing into the second power source ground line GL2 is flowing into the first power source ground line GL1, and detects that the ground abnormality is caused in the second control system 32 (S80). In this case, in the second control system abnormality fail-safe measure, the integral microcomputer 80 switches the second power source relay 62 to the off state while maintaining the first power source relay 52 in the on state, and the integral microcomputer 80 invalidates the external command value θs* (brings the external command value θs* to zero).

With the embodiment described above, the following functions and effects can be obtained in addition to the functions and effects (1), (3), and (4) of the first embodiment described above. (5) The integral abnormality detection circuit 83 detects a characteristic state of the power source ground current value Ignd1, Ignd2 for a case where a ground abnormality is caused in accordance with the difference between the power source current values Ignd1 and Ignd2 (S50a and S60a), and detects a ground abnormality on the basis of the detection results. Consequently, a ground abnormality can be detected with higher accuracy.

Such a case, in which the result of a comparison between the control systems 31 and 32 is used, is particularly effective from the viewpoint of implementing a configuration in which the control systems 31 and 32 have a common microcomputer that controls the drive circuits 50 and 60 as in the embodiment.

Each of the embodiments described above can also be implemented in the following forms. In the first embodiment, mutual check (mutual monitoring) of a ground abnormality may be performed by each one of the microcomputers 55 and 65 by also executing an abnormality detection process to be executed by the other of the microcomputers 55 and 65. Consequently, a reduction in reliability of the steering ECU 30 can be suppressed suitably. In this case, each one of the microcomputers 55 and 65 may acquire necessary information from the other of the microcomputers through inter-microcomputer communication.

In the first embodiment, the functions of the abnormality detection circuits 73 and 74 may be concentrated in either of the microcomputers 55 and 65. In this case, the microcomputer in which the functions of the abnormality detection circuits 73 and 74 are concentrated may acquire necessary information from the other microcomputer through inter-microcomputer communication.

In the first embodiment, as in the second embodiment, an integral microcomputer 80 may be provided in place of the microcomputers 55 and 65. In this case, the integral microcomputer 80 may execute the abnormality detection process for one of the control systems 31 and 32 to which the external power source is connected. Alternatively, the integral microcomputer 80 may execute the abnormality detection process separately for the control systems 31 and 32. In this case, power source voltage values may be acquired by providing a voltage sensor or a current sensor.

In the first embodiment, the processes in S50$a$ and S60$a$ may be executed in place of those in S50 and S60 as in the second embodiment. Alternatively, S50$a$ and S60$a$ may be executed in combination with S50 and S60. In this case, each of the microcomputers 55 and 65 may acquire necessary information from the other microcomputer through inter-microcomputer communication. In the second embodiment, on the other hand, the processes in S50 and S60 may be executed in place of those in S50$a$ and S60$a$ as in the first embodiment. Alternatively, S50 and S60 may be executed in combination with S50$a$ and S60$a$. In this case, the integral microcomputer 80 may acquire necessary information by adding a sensor or the like.

In the second embodiment, the integral microcomputer 80 may be connected to the second external power source 44, or may be connected to an external power source that is different from the external power sources 43 and 44. In the second embodiment, in S50$a$, it may be determined whether or not the absolute value of the ratio between the power source ground current values Ignd1 and Ignd2, that is, Ignd1/Ignd2 or Ignd2/Ignd1, is equal to or less than a threshold $\gamma$. The threshold $\gamma$ is set to a value obtained by increasing and decreasing the tolerance due to various components in the control systems 31 and 32 with respect to one in consideration of the tolerance. In this case, in the case of S50$a$: NO, it may be determined in S60$a$ whether or not Ignd2/Ignd1 is larger than one, for example. In the case where Ignd2/Ignd1 is larger than one, it is indicated that a current that is larger than that flowing into the first power source ground line GL1 is flowing into the second power source ground line GL2. In the case where Ignd2/Ignd1 is smaller than one, meanwhile, it is indicated that a current that is larger than that flowing into the second power source ground line GL2 is flowing into the first power source ground line GL1. Also in this case, a ground abnormality can be detected with higher accuracy.

In each of the embodiments, a ground abnormality may be detected only in a situation in which torque generated by the motor 20 is zero. In this case, it may be determined, prior to the determination in S30, whether or not torque generated by the motor 20 is zero, and a d-axis current for abnormality detection may be applied in the case where torque generated by the motor 20 is zero. In the case where torque generated by the motor 20 is not zero, the electric circuit is in operation, and thus a ground abnormality can be detected without applying a d-axis current for abnormality detection. To determine whether or not torque generated by the motor 20 is zero, the d-axis current command value Id* and the q-axis current command value Iq* may be used, for example. Alternatively, it may be determined, prior to the determination in S30, whether or not the vehicle A is traveling straight forward, besides during a process to start the steering ECU 30. It may be determined whether or not the vehicle A is traveling straight forward using the width of variation in external command value θs*, the width of variation in rotational angle θm of the motor 20, or the width of variation in actual current of the motor 20. In the modification, electric power consumed to detect a ground abnormality can be reduced.

In each of the embodiments, in S30, a q-axis current for abnormality detection may be applied in place of a d-axis current for abnormality detection. In this case, it is possible to create a state in which the electric circuits of the control systems 31 and 32 are in operation without causing the motor 20 to generate torque by applying q-axis currents for abnormality detection in opposite directions (that are shifted in phase by 180°) in the system coils C1 and C2. Consequently, as with each of the embodiments described above, a ground abnormality can be detected irrespective of the state of drive of the motor 20, including a state in which it is not necessary for the motor 20 to generate torque.

In each of the embodiments, the threshold $\alpha$ and the threshold $\beta$ may be changed. For example, these values may be set such that a ground abnormality can be detected beforehand. Consequently, a fail-safe measure can be activated proactively before a ground abnormality is caused. The modification can function particularly effectively in the case of the configuration according to the second embodiment in which only the detection results are used in order to detect a ground abnormality.

In each of the embodiments, in the case where the microcomputers 55 and 65 or the integral microcomputer 80 is connected to a ground that is different from the internal ground 33, the power source voltage values Vba1 and Vba2 may be acquired by providing a voltage sensor or a current sensor.

In each of the embodiments, it is only necessary that the steering ECU 30 should include a plurality of control systems, and the steering ECU 30 may include three or four or more control systems. In this case, it is only necessary that a number of external power sources should be provided, the number corresponding to the number of the control systems.

In each of the embodiments, in each of the control system abnormality fail-safe measures, the microcomputer may control drive of the motor 20 such that the control system in which control of the motor 20 has been stopped may be compensated for by the remaining control system.

In each of the embodiments, in the case where the rotational speed of the motor 20 is high, field weakening control may be executed using a negative d-axis current. In each of the embodiments, the current detection circuits 54 and 64 may perform a detection using a non-contact sensor that uses a magnetic sensor such as a Hall element or using a component that is present on the electric circuit such as a coil for noise suppression. This also applies to the current sensors 51$a$ and 61$a$ and the voltage sensors 51$b$ and 61$b$.

In each of the embodiments, the motor 20 may be two independent motors. In each of the embodiments, the automatic steering ECU 4 may output a command value converted into the rotational angle θm as the external command value θs*.

Each of the embodiments may be applied to the automatic steering device 1 which is adapted to interrupt or stop automatic steering control in the case where an interventional operation is provided while a command to set the automatic steering mode is provided, and to switch to a state in which a command to set the automatic steering mode is not provided, that is, EPS control.

In each of the embodiments, the automatic steering mode may have a function of applying a steering force to the steering shaft 11 by means of an anti-skid device (vehicle stability control), for example.

Each of the embodiments can also be applied to a steering device that does not have the automatic steering mode, that is, a steering device that executes only EPS control. Each of the embodiments can also be applied to a steer-by-wire steering device, for example. In this case, the steering force application mechanism 3 may be provided around the rack shaft 12. In the modification, a function that allows the steering wheel 10 to rotate in conjunction with steering of the steered wheels 15 may be stopped, for example, during the automatic steering mode so that the steering wheel 10 does not rotate in conjunction with steering of the steered wheels 15.

In each of the embodiments, the steering wheel 10 may be omitted in the case where only the automatic steering mode is provided and a steering operation by the user is not assumed.

In each of the embodiments, the automatic steering device 1 is embodied in a column assist EPS. However, the automatic steering device 1 may be applied to a rack assist EPS or a pinion assist EPS.

Each of the embodiments can also be applied to control of a drive motor that drives the steered wheels 15. Each of the embodiments can also be applied to control of a motor used for purposes other than for vehicles.

What is claimed is:

1. A motor control device comprising:
   a plurality of drive circuits that operate to supply drive electric power to windings of a motor to be controlled using external power sources as electric power sources; and
   a plurality of control systems constituted by respectively connecting different external power sources to the plurality of drive circuits, the plurality of control systems being configured such that:
   low potential sides of the drive circuits and low potential sides of corresponding external power sources are connected to each other via a plurality of power source grounds which are independent grounds for the control systems, and the low potential sides of the drive circuits are connected to each other via an internal ground which is a common ground, and
   a plurality of current detection circuits are provided between the plurality of power source grounds and the internal ground to detect respective ground currents which are currents of the plurality of power source grounds,
   the plurality of control systems including an abnormality detection circuit that detects a ground abnormality which is an abnormality in each of the power source grounds in the plurality of control systems based on results of detection performed by the plurality of current detection circuits.

2. The motor control device according to claim 1, wherein:
   the abnormality detection circuit computes power source currents of the corresponding external power sources for the plurality of control systems based on the drive electric power supplied to the motor by the drive circuits; and
   the abnormality detection circuit detects the ground abnormality based on a difference between each of the power source currents for the plurality of control systems and results of detection performed by each of the current detection circuits corresponding to the plurality of control systems.

3. The motor control device according to claim 1, wherein the abnormality detection circuit detects the ground abnormality based on a result of comparing, among the plurality of control systems, the results of detection performed by current detection circuits corresponding to the plurality of control systems.

4. The motor control device according to claim 1, wherein each of the drive circuits applies a d-axis current in a dq coordinate system to the motor at a timing when the abnormality detection circuit detects the ground abnormality.

5. The motor control device according to claim 4, wherein the timing when the abnormality detection circuit detects the ground abnormality includes a situation in which torque generated by the motor is zero.

6. A steering control device comprising:
   the motor control device according to claim 1,
   wherein a motor that is included in a steering mechanism of a vehicle and that provides the steering mechanism with power for varying a steered angle of steered wheels is controlled based on an electric signal being input from outside, the electric signal including an external command value.

* * * * *